United States Patent [19]
Smith

[11] 3,948,156
[45] Apr. 6, 1976

[54] AUTOMATIC BEVERAGE-MAKING APPARATUS

[75] Inventor: Edwin Wilson Smith, Hampton, England

[73] Assignee: Cona Limited, Wimbledon, England

[22] Filed: May 16, 1974

[21] Appl. No.: 470,486

[30] Foreign Application Priority Data
June 11, 1973 United Kingdom............ 27758/73

[52] U.S. Cl. ............... 99/280; 99/301; 99/304; 99/305
[51] Int. Cl.[2] ............................. A47J 31/047
[58] Field of Search .............. 99/280, 281–282, 99/283, 295, 299, 300, 302, 304–305, 307; 219/427, 442, 528

[56] References Cited
UNITED STATES PATENTS

| | | | |
|---|---|---|---|
| 1,397,620 | 11/1921 | Clark | 99/281 |
| 2,561,134 | 7/1951 | Peters | 99/282 X |
| 2,798,932 | 7/1957 | Evans | 219/427 X |
| 3,100,434 | 8/1963 | Bunn | 99/282 |
| 3,319,561 | 5/1967 | Bloomfield et al. | 99/283 |
| 3,396,653 | 8/1968 | Rutherford et al. | 99/282 |
| 3,596,588 | 8/1971 | Moss | 99/302 R X |

*Primary Examiner*—Robert W. Jenkins
*Assistant Examiner*—Arthur O. Henderson
*Attorney, Agent, or Firm*—Sughrue, Rothwell, Mion & Zinn

[57] ABSTRACT

An automatic beverage-making apparatus is described which has a stand and a receptacle and water may be supplied to solid material such as ground coffee in the receptacle by a pipe means within the stand, said pipe means being provided with a heater to heat the water and means for controlling the throughput of water, the time for which water flows through the pipe means and the energisation of the heater respectively.

7 Claims, 3 Drawing Figures

AUTOMATIC BEVERAGE-MAKING APPARATUS

SUMMARY OF THE INVENTION

This invention relates to apparatus for automatically making beverages, such as coffee.

According to the present invention there is provided an automatic beverage-making apparatus comprising a stand; a receptacle associated with the stand for receiving the solid material from which the beverage is to be made; pipe means provided within the stand and having an inlet for connection to a water supply and an outlet to said receptacle; an electrical heater associated with pipe means arranged to heat water passing through the pipe means when the apparatus is in operation; means for providing a substantially constant throughput of water through the pipe means when the apparatus is in operation, and timing means provided in the stand for controlling the duration of flow of water through the pipe means and the time for which the heater is energised when the apparatus is in operation.

Preferably the heater is an electric immersion heater and is positioned within the pipe means.

More preferably the means for providing a substantially constant throughput of water through the pipe means comprises a flow-control valve which may be supplemented by a regulator for controlling the water pressure.

Filter means may be associated with the receptacle so that the water can flow through the solid material to form the beverage which can then flow into a jug or like receiver; if desired, a hot plate may be provided on which the jug can be stood so that the beverage can be kept warm, and filter means may also be associated with the inlet end of the pipe means to prevent bits of scale and other matter entering the pipe means.

With the present apparatus, the water can be very rapidly heated by its passage past the heater to the desired temperature for infusion, so that it is possible to provide a desired quantity of beverage in a short period of time; for example up to 3 pints of coffee can be prepared in approximately 4 or 5 minutes.

BRIEF DESCRIPTION OF THE DRAWINGS

In order to enable the invention to be more readily understood, reference will now be made to the accompanying drawings, which illustrate by way of example, an embodiment thereof, and wherein.

DETAILED DESCRIPTION OF THE ILLUSTRATED EMBODIMENT

Figure 1:
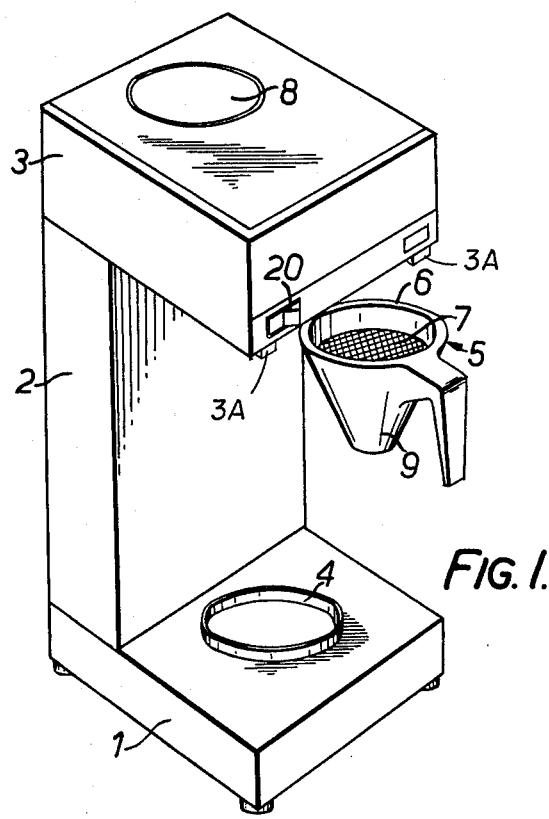
FIG. 1 is a perspective view of a coffee-making apparatus.

Referring now to the drawings, there is shown an automatic coffee-making apparatus which comprises a substantially C-shaped housing formed by a framework covered with sheet metal. The housing has a rectangular base portion 1, an upright portion 2 and a rectangular top portion 3 overhanging the base portion. The base portion 1 is provided on its upper surface with an electric hotplate 4 on which a jug may be stood to receive prepared coffee. The underside of the top portion 3 is formed with rails 3A along which a cup-shaped receptacle 5 for ground coffee may be slid, the receptacle 5 having a flange 6 engageable with the rails and an apertured or perforated bottom 7 on which a filter paper may be laid. The receptacle 5 also has a funnel-shaped outlet 9 through which prepared coffee may drain into the jug. The top portion 3 is also provided with another electric hotplate 8 on which a spare jug of prepared coffee may be kept warm.

Figure 2:
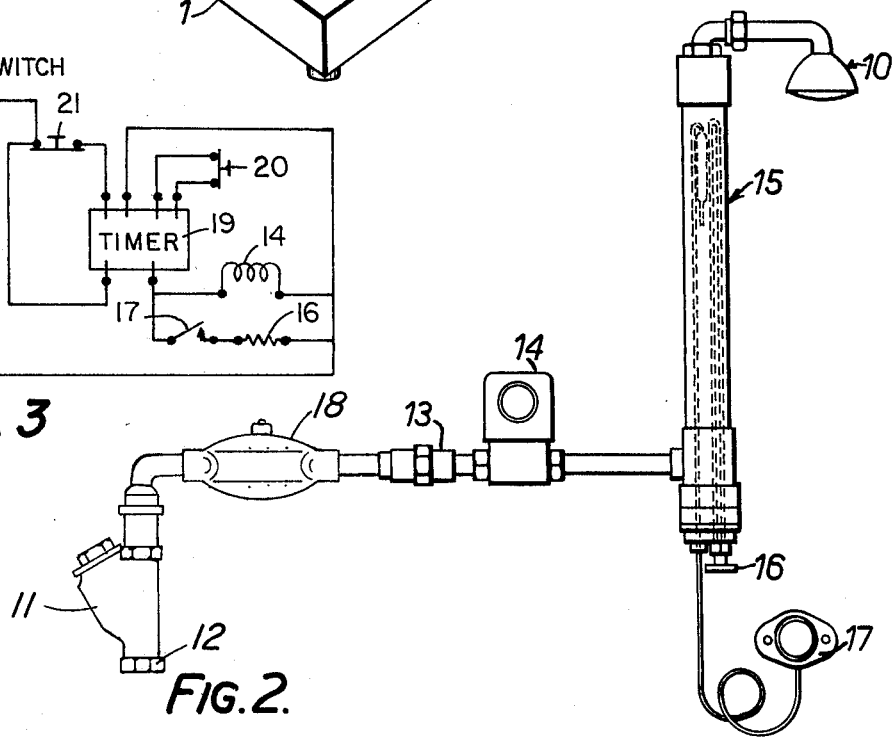
FIG. 2 is an outline of pipe means and water heater for the coffee-making apparatus.

A spray nozzle or sparger 10 (FIG. 2) is mounted inside the top portion 3 above the location for the receptacle 5 for spraying water onto the ground coffee, the spray nozzle 10 being connected by pipe means, incorporating heating means and control means to an inlet connection 12 which may be fitted directly to a mains water supply. A strainer 11 is incorporated in the pipe means adjacent the water inlet 12 in order to prevent bits of scale or other foreign matter from the main water supply from entering the pipe means. Following the strainer is a flow-control valve 13 of a type which is fitted with a pressure-sensitive diaphragm which is compressed when the pressure increases over a preset limit and thus closes the valve orifice, and positioned either before or after the strainer 11 is a regulator 18 for controlling the water pressure, so that the throughput of water through the valve 13 is independent of any fluctuations in the mains water pressure. A suitable flow valve is that known under the trade name "NETA" VALVE. The valve 13 is set to the required rate of flow of water.

A solenoid valve 14 is also incorporated in the pipe means to start and stop the flow of water. Between the solenoid valve 14 and the spray nozzle 10, an electric immersion heater 15 is incorporated in the pipe means for heating the water and a solid state timer 19 (FIG. 3) which is adjustable from 1 to 5 minutes with a 2% error is connected to and controls the operation of the solenoid valve 14 and the heater 15, which is conveniently a 3 kw. immersion heater.

Figure 3:
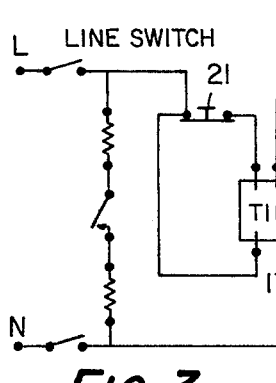
FIG. 3 is a circuit diagram of the coffee-making apparatus.

FIG. 3 is a circuit diagram of the apparatus showing the elements of the hot plates 4 and 8 connected across a line switch. The diagram also shows the solid state timer 19 and its connections to the solenoid valve 14 and the element 16 of the heater 15 which, in conventional manner, is protected by a fixed temperature cut out 17. Depression of a start button 20 causes the timer 19 to be energised, whereby a coffee-making cycle is initiated as will be described hereinafter and a stop button 21 is provided for de-energising the timer if it is necessary to abort the coffee-making cycle.

In the operation of the apparatus hereinbefore described, the receptacle 5 is slid out from underneath the top portion 3 and a circular filter paper is laid on the bottom of the receptacle 5 whereafter a charge of ground coffee is spread evenly over the filter paper and the receptacle 5 is returned. The apparatus which is connected to a mains water supply and to a source of electricity is then operated by depressing a start button indicated generally at 20. Operation of the start button 20 causes the solid state timer to be energised so that a coffee-making cycle begins. As soon as the timer is energised, the solenoid valve 14 is operated by the timer so that water can flow from the mains through the pipe means, and the immersion heater 15 is switched on so as to heat the water which is arranged to flow over it. The hot water is sprayed by the spray nozzle 10 over the ground coffee through which it percolates and the prepared coffee collects in the jug. At the end of the coffee-making cycle, the timer de-energises the solenoid valve 14 so that the flow of water ceases and also de-energises the heater 15. When the water has finished draining through the ground coffee, the receptacle 5 can be removed and the coffee grounds can be thrown away so that the receptacle is ready to receive a fresh charge of ground coffee for the next coffee-making cycle which will commence upon operation of the start button 20. The apparatus also incorporates a stop button indicated at 21 in FIG. 3 which, when operated, de-energises the timer. The stop button 21 is used in case it is necessary or desirable to terminate a coffee-making cycle at any moment, e.g. if the jug to receive the coffee is of too small a capacity.

It will be appreciated that the water temperature at the spray nozzle 10 will be determined by the rate of flow of the water, the capacity of the heater 15 and the inlet temperature of the water. It will also be appreciated that the total amount of water flowing in a coffee-making cycle will be determined by the period of time for which the solenoid valve 14 is held in the open position by the operation of the timer.

In many cases the inlet temperature of the water may be ignored and since the apparatus will be provided with a heater of a fixed capacity, the rate of flow of water and the period for which it flows will be controlled by appropriate settings of the flow-control valve 13 and the timer to provide a desired quantity of water at a desired temperature. For example, using a 3 kw. heater, the apparatus may be set to provide 3 pints of water at a temperature of 208°F. in a period of 4½ minutes.

Where the inlet temperature of the water is likely to fluctuate or be unusually high, for example, because the main water pipe passes through a kitchen, steam could be formed at the spray nozzle 10 and this would be undesirable, not only from the nuisance point of view, but because the required amount of water would not reach the coffee. In order to obviate the formation of steam, an adjustable power controller may be provided in the heater circuit so as to adjust the heater to take account of the inlet water temperature, the element 16 of the heater itself being protected in conventional manner by the fixed temperature cut-out 17.

Once a jug of coffee has been prepared, it may be kept warm on the hotplate 8 of the top portion 3 of the housing while a second jug of coffee is prepared.

With the present apparatus it is possible to prepare a given quantity of coffee in a short period of time and the apparatus is particularly suitable for use in catering establishments where the demand for coffee can fluctuate throughout the day.

As the water flows fairly rapidly past the heater 15 it is found that there is little or no furring of the heater 15 even when the water is very hard.

Although the present apparatus has been particularly described with reference to the preparation of coffee, it will be appreciated that it can be used to prepare other beverages, such as tea.

What is claimed is:

1. An automatic beverage making apparatus comprising a stand; a receptacle associated with the stand for receiving the solid material from which the beverage is to be made; a conduit within the stand and having an inlet for connection to a water supply and an outlet to said receptacle, an electrical heater within said conduit and arranged to heat water continuously passing through a flow passage defined between the heater and the inner wall of the conduit when the apparatus is in operation; valve means associated with said conduit, normally closed and operable to permit water to flow through said conduit; means to supply electric current to said heater; switch means in said stand; and timing means provided in said stand and operable by switch means to open said valve means and energize said heater for a predetermined time sufficient to supply a predetermined quantity of heat to a predetermined quantity of water as it flows through said conduit, to bring water to the temperature required to brew the beverage said timing means then closing said valve means, and de-energizing said heater.

2. An apparatus as claimed in claim 1, wherein the inlet end of the conduit is provided with filter means to prevent bits of scale and other foreign matter from entering the conduit.

3. An apparatus as claimed in claim 1, wherein the conduit is provided with a solenoid valve adapted to be controlled by the timing means to cut off the flow of water.

4. An apparatus as claimed in claim 1, wherein the heater is an electric immersion heater and is positioned within the conduit.

5. An apparatus as claimed in claim 4, wherein the electric immersion heater has an element which is provided with a fixed temperature cut-out.

6. An apparatus as claimed in claim 1, wherein the timing means is a solid state timer.

7. An apparatus as claimed in claim 1, wherein the stand is provided with a stop means which is adapted to de-energise the timing means.

* * * * *